(12) United States Patent
Slik (10) Patent No.: US 11,860,739 B2
(45) Date of Patent: *Jan. 2, 2024

(54) METHODS FOR MANAGING SNAPSHOTS IN A DISTRIBUTED DE-DUPLICATION SYSTEM AND DEVICES THEREOF

(71) Applicant: NetApp, Inc., San Jose, CA (US)

(72) Inventor: David Slik, Northridge, CA (US)

(73) Assignee: NETAPP, INC., San Jose, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/816,457

(22) Filed: Aug. 1, 2022

(65) Prior Publication Data

US 2023/0016352 A1 Jan. 19, 2023

Related U.S. Application Data

(63) Continuation of application No. 16/825,459, filed on Mar. 20, 2020, now Pat. No. 11,436,088, which is a continuation-in-part of application No. 15/233,519, filed on Aug. 10, 2016, now Pat. No. 11,347,691.

(51) Int. Cl.
*G06F 16/00* (2019.01)
*G06F 11/14* (2006.01)
*G06F 12/02* (2006.01)
*G06F 16/182* (2019.01)
(Continued)

(52) U.S. Cl.
CPC ...... *G06F 11/1448* (2013.01); *G06F 11/1435* (2013.01); *G06F 12/0253* (2013.01); *G06F 16/1724* (2019.01); *G06F 16/1824* (2019.01); *H04L 9/0643* (2013.01); *G06F 2201/84* (2013.01)

(58) Field of Classification Search
CPC ............ G06F 11/1448; G06F 11/1435; G06F 12/0253; G06F 16/1724; G06F 16/1824; G06F 2201/84; G06F 11/1471; H04L 9/0643; H04L 9/0894
See application file for complete search history.

(56) References Cited

U.S. PATENT DOCUMENTS

7,428,751 B2  9/2008  Oom et al.
8,095,790 B2  1/2012  Takashima
(Continued)

*Primary Examiner* — Debbie M Le
(74) *Attorney, Agent, or Firm* — Troutman Pepper Hamilton Sanders LLP (NetApp)

(57) ABSTRACT

Methods, non-transitory computer readable media, and devices that more effectively manage snapshots by creating a namespace including files described by stored file recipe objects and each comprising fragments, directories described by metadata in the file recipe objects and each comprising one or more of the files, and snapshots described by stored snapshot request objects. Content of one of the directories are identified based on an identification of corresponding ones of the file recipe objects that existed within the namespace at a specified time. At least one of the files, included in the identified content and existing within the namespace at the specified time, is accessed in response to one or more received requests. A garbage collection operation is periodically performed to delete the recipe objects that are marked for deletion by tombstone objects and are unreferenced by any of the snapshots as determined based on the snapshot request objects.

20 Claims, 8 Drawing Sheets

(51) Int. Cl.
  *H04L 9/06* (2006.01)
  *G06F 16/17* (2019.01)

(56) References Cited

U.S. PATENT DOCUMENTS

| | | | |
|---|---|---|---|
| 8,527,544 B1 * | 9/2013 | Colgrove | G06F 3/0641 |
| | | | 707/791 |
| 8,650,228 B2 * | 2/2014 | Wideman | G06F 16/1727 |
| | | | 711/E12.001 |
| 8,775,562 B2 | 7/2014 | Chavez et al. | |
| 9,047,304 B2 | 6/2015 | Yakushev et al. | |
| 9,304,866 B1 * | 4/2016 | Gardner | G06F 3/0641 |
| 9,354,976 B2 * | 5/2016 | Amlekar | G06F 11/006 |
| 9,626,518 B2 | 4/2017 | Gardner | |
| 9,990,253 B1 * | 6/2018 | Rajimwale | G06F 11/1435 |
| 10,191,914 B2 | 1/2019 | Manville et al. | |
| 10,291,705 B2 | 5/2019 | Jung et al. | |
| 11,100,051 B1 | 8/2021 | Mao et al. | |
| 2002/0194209 A1 | 12/2002 | Bolosky et al. | |
| 2012/0016839 A1 | 1/2012 | Yueh | |
| 2013/0179684 A1 | 7/2013 | Furukawa | |

\* cited by examiner

FIG. 8 ion Ser. No. 16/825,459, filed Mar. 20, 2020, which is a
METHODS FOR MANAGING SNAPSHOTS IN A DISTRIBUTED DE-DUPLICATION SYSTEM AND DEVICES THEREOF This application is a continuation of U.S. patent application Ser. No. 16/825,459, filed Mar. 20, 2020, which is a continuation in-part of U.S. patent application Ser. No. 15/233,519, filed Aug. 10, 2016, each of which is hereby incorporated by reference in its entirety.

FIELD

This technology generally relates to data storage management and, more particularly, methods for managing snapshots in a distributed de-duplication system and devices thereof.

BACKGROUND

In many data systems, broadly viewed, a client (acting as a data source) sends data to a server (a data storage system) via a communications channel, along with instructions for the server to retain the data. At a future time, a client (acting as a data destination) sends instructions to the server to request retained data as it existed at a given point in time, via a communication channel, and receives the requested data from the server. An example of such a system is a data storage system; however, these data systems may include any system in which a server somehow processes, stores and transmits data uploaded from a sender. In many such systems, large amounts of data may need to be exchanged between the client and the server via the communications channel, and large amounts of data may need to be stored over long periods of time. However, communications channels generally have bandwidth constraints and usage costs, and data storage devices generally have capacity constraints and usage costs. Thus, it is a goal of such data systems is to get as much usable data across the communications channel to the server as possible, and to consume as little of the storage capacity as possible.

Data deduplication refers to techniques for reducing or eliminating redundant data in such systems, for example to improve storage utilization in a data storage system and/or to reduce bandwidth usage on the communications channel. Prior de-duplication architectures require deep integration into the storage system, including the addition of low-latency distributed databases, complex fault recovery systems to prevent inconsistent states, and integration at multiple points within the in-band data path. Additionally, most of the complexity associated with de-duplication arises from creating scalable shared databases that store the fingerprints of chunks of data. These databases are used to look up and identify matching fingerprints when data is stored or retrieved. These databases are complex to develop and maintain, especially when system capacity and geographic scope is scaled.

DETAILED DESCRIPTION

Figure 1:
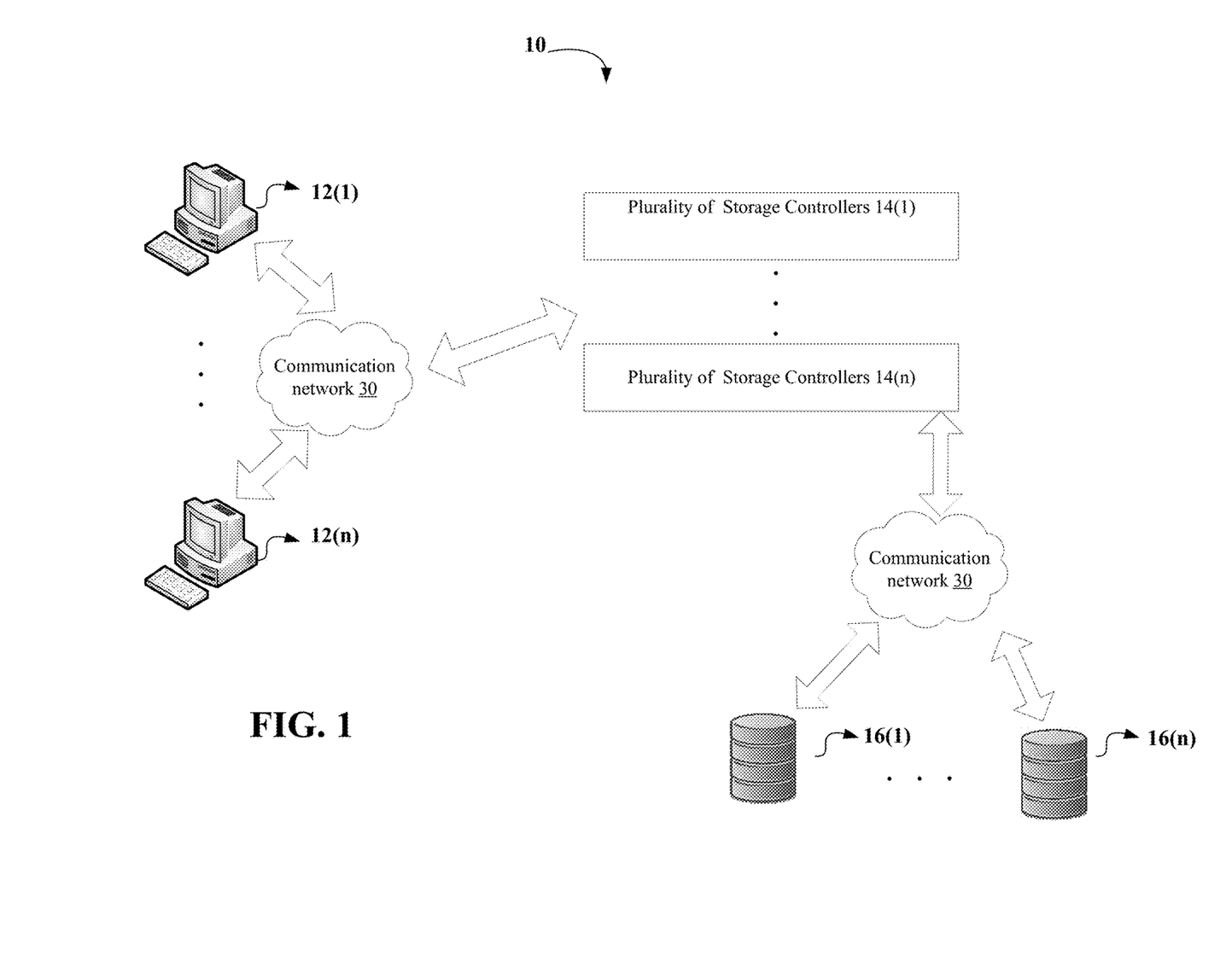
FIG. 1 is a block diagram of an environment with a plurality of storage controllers that manages storage in a distributed de-duplication system.

An environment 10 with a plurality of client computing devices 12(1)-12(n), an exemplary plurality of storage controllers 14(1)-14(n), and a plurality of storage repositories 16(1)-16(n), is illustrated in FIG. 1. In this particular example, the environment 10 in FIG. 1 includes the client computing devices 12(1)-12(n), the storage controllers 14(1)-14(n), and the storage repositories 16(1)-16(n), coupled via communication networks 30(1) and 30(2), although the environment 10 could include other types and numbers of systems, devices, components, and/or other elements coupled in other manners. The client computing devices 12(1)-12(n), the storage controllers 14(1)-14(n), and the storage repositories 16(1)-16(n) may exist at a specific geographic or network location, may be spread across multiple geographic or network locations, or may be partially or completely virtualized in a cloud environment.

The example of a method for managing snapshots in a distributed de-duplication system is executed by the storage controllers 14(1)-14(n), although the technology illustrated and described herein could be executed by other types and/or numbers of other computing systems and devices or individually by one or more of the storage controllers 14(1)-14(n). The environment 10 may include other types and numbers of other network elements and devices including routers and switches, as is generally known in the art and will not be illustrated or described herein. This technology provides a number of advantages including providing methods, non-transitory computer readable media and devices for improved management of data storage snapshots in a distributed de-duplication system.

Figure 2:
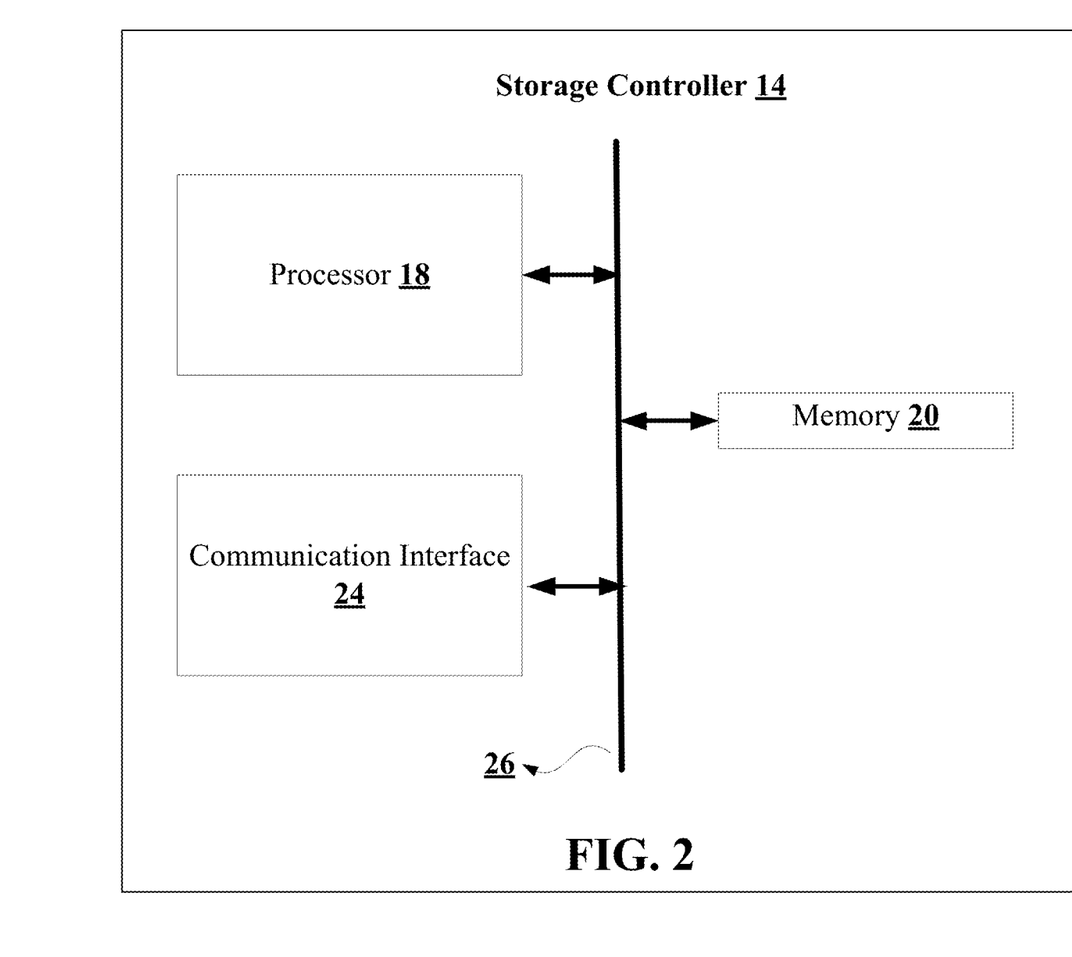
FIG. 2 is a block diagram of one of the exemplary storage controllers shown in FIG. 1.

Referring to FIG. 2, in this example each of the storage controllers 14(1)-14(n) includes a processor 18, a memory 20, and a communication interface 24, which are coupled together by a bus 26, although the storage controllers 14(1)-14(n) may include other types and numbers of elements in other configurations.

The processor 18 of each of the storage controllers 14(1)-14(n) may execute one or more programmed instructions stored in the memory 20 for storage management operations, as illustrated and described in the examples herein, although other types and numbers of functions and/or other operation can be performed. The processor 18 of each of the storage controllers 14(1)-14(n) may include one or more central processing units ("CPUs") or general purpose processors with one or more processing cores, although other types of processor(s) could be used.

The memory 20 of each of the storage controllers 14(1)-14(n) stores the programmed instructions and other data for one or more aspects of the present technology as described and illustrated herein, although some or all of the programmed instructions could be stored and executed elsewhere. A variety of different types of memory storage repositories, such as a non-volatile memory, random access memory (RAM), flash memory, or a read only memory (ROM) in the system or hard disk, SSD, CD ROM, DVD ROM, or other computer readable medium which is read from and written to by a magnetic, optical, or other reading and writing system that is coupled to the processor 18, can be used for the memory 20.

The communication interface 24 of each of the storage controllers 14(1)-14(n) operatively couples and communicates with the client computing devices 12(1)-12(n), and the storage repositories 16(1)-16(n), which are all coupled together by the communication networks 30(1) and 30(2), although other types and numbers of communication networks or systems with other types and numbers of connections and configurations to other devices and elements. By way of example only, the communication networks 30(1) and 30(2) can use TCP/IP over Ethernet and industry-standard protocols, including NFS, CIF S, S3, CDMI, HTTP and SNMP, although other types and numbers of communication networks, can be used. The communication networks 30(1) and 30(2) in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a PCI bus, although other bus types and links may be used, such as PCI-Express or hyper-transport bus.

Each of the client computing devices 12(1)-12(n) includes a central processing unit (CPU) or processor, a memory, and an I/O system, which are coupled together by a bus or other link, although other numbers and types of network devices could be used. The client computing devices 12(1)-12(n) communicate with the storage controllers 14(1)-14(n) for storage management, although the client computing devices 12(1)-12(n) can interact with the storage controllers 14(1)-14(n) for other purposes. By way of example, the client computing devices 12(1)-12(n) may run application(s) that may provide an interface to make requests to access, modify, delete, edit, read or write data within the storage repositories 16(1)-16(n) via the communication network 30(1) and the storage controllers 14(1)-14(n).

Each of the storage repositories 16(1)-16(n) includes a central processing unit (CPU) or processor, and an I/O system, which are coupled together by a bus or other link, although other numbers and types of network devices could be used. Each storage repositories 16(1)-16(n) assists with storing data, although the storage repositories 16(1)-16(n) can assist with other types of operations such as storing of files or structured objects. Various network processing applications, such as CIFS applications, NFS applications, HTTP storage device applications, and/or FTP applications, may be operating on the storage repositories 16(1)-16(n) and transmitting data (e.g., files or web pages) in response to requests from the storage controllers 14(1)-14(n), and the client computing devices 12(1)-12(n). It is to be understood that the storage repositories 16(1)-16(n) may include hardware such as hard disk drives, solid state devices (SSD), or magnetic tapes, or software or may represent a system with multiple external resource servers, which may include internal or external networks.

Although the exemplary network environment 10 includes the client computing devices 12(1)-12(n), the storage controllers 14(1)-14(n), and the storage repositories 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

The examples also may be embodied as a non-transitory computer readable medium having instructions stored thereon (e.g., in the memory 20) for one or more aspects of the present technology as described and illustrated by way of the examples herein, as described herein, which when executed by a processor (e.g., processor 18), cause the processor to carry out the steps necessary to implement the methods of this technology as described and illustrated with the examples herein.

Figure 3:
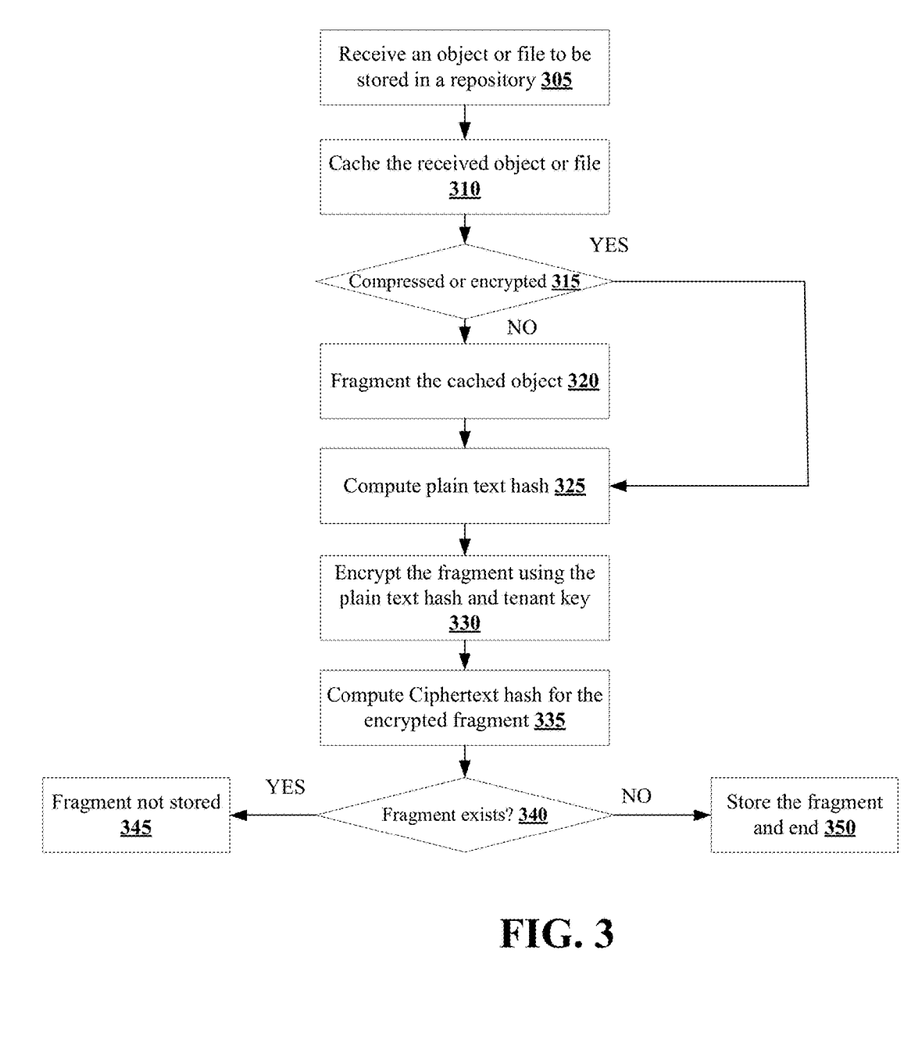
FIGS. 3-5 are exemplary flow charts of an example of a method for managing storage in a distributed de-duplication system.

An example of a method for managing storage in a distributed de-duplication system will now be described herein with reference to FIGS. 1-8. Referring more specifically to FIG. 3, an exemplary method of ingesting objects or files is illustrated. The exemplary method begins at step 305 where one of the storage controllers 14(1)-14(n) receives an object or file to be stored into one of the storage repositories 16(1)-16(n) from one of the client computing devices 12(1)-12(n), although the storage controllers 14(1)-14(n) can receive other types or amounts of data from other devices.

Next in step 310, the receiving one of the storage controllers 14(1)-14(n) caches the received object or file into a cache within memory 20, although the one of the storage controllers 14(1)-14(n) can store the object or file at other transitory or non-transitory memory storage locations.

In step 315, the receiving one of the storage controllers 14(1)-14(n) determines when the entire cached object or file is compressed or encrypted, or otherwise unlikely to benefit from further compression and sub-object deduplication. Accordingly, when the receiving one of the storage controllers 14(1)-14(n) determines that the cached object or file is compressed, encrypted, or otherwise is unlikely to benefit from further compression and sub-object deduplication, then the Yes branch is taken to step 325, which will be further illustrated below. In this example, when the cached object or file is either compressed or encrypted it means that there is low probability that further compression and sub-object deduplication will reduce the network and storage consumption associated with the object or the file.

However back in step 315, when the receiving one of the storage controllers 14(1)-14(n) determines that the cached object is neither compressed nor encrypted, and that fragmentation, compression, and sub-object deduplication will likely reduce the network and storage consumption associated with storing the object or the file, then the No branch is taken to step 320.

In step 320, the receiving one of the storage controllers 14(1)-14(n) fragments the cached object or file. Prior or immediately subsequent to fragmenting, the receiving one of the plurality of storage controllers 14(1)-14(n) compresses the object. In this example, fragmenting of the object or file relates to splitting the object or file into multiple fragments of equal or variable size, although other types or techniques of fragmenting can also be performed by the receiving one of the storage controllers 14(1)-14(n) on the cached object or file.

Next in step 325, the receiving one of the storage controllers 14(1)-14(n) computes the plaintext hash value for each of the fragments of the cached object or file using one or more hashing algorithms. Additionally, upon computing the plaintext hash value for each fragment, the receiving one of the storage controllers 14(1)-14(n) also obtains a tenant key associated with the requesting one of the client computing devices 12(1)-12(n), which was noted at the time of initializing the one of the client computing devices 12(1)-12(n), from the memory 20, although the tenant key can be obtained from other locations.

Next in step 330, the receiving one of the storage controllers 14(1)-14(n) computes an encrypted fragment key for each of the fragments using the computed fragment plaintext hash and the obtained tenant key, although the receiving one of the storage controllers 14(1)-14(n) can compute the encrypted fragment key using other techniques or parameters. Using the computed encrypted fragment key, the receiving one of the storage controllers 14(1)-14(n) encrypts each of the fragments with their corresponding computed fragment key, although the fragment can be encrypted using other techniques or parameters.

Next in step 335, the receiving one of the storage controllers 14(1)-14(n) computes a ciphertext hash value for each of the fragments by hashing the contents of the encrypted fragment, although the receiving one of the storage controllers 14(1)-14(n) can use other techniques or parameters to compute the ciphertext hash value. Additionally in this example, once the ciphertext hash values are computed, the names of each of the encrypted fragments are replaced by the one of the storage controllers 14(1)-14(n) with a corresponding one of the computed ciphertext hash values.

Next in step 340, the receiving one of the storage controllers 14(1)-14(n) determines, for each of the fragments (with the name equal to the computed ciphertext hash value), when there is already an existing fragment with the same name stored in one or more of the storage repositories 16(1)-16(n), although the one of the storage controllers 14(1)-14(n) can make the determination in step 340 using other memory locations. In this example, when the receiving one of the storage controllers 14(1)-14(n) determines that a fragment with the same name exists, then there is deduplication with the fragment. However, when the fragment with the same name does not exists then there is no deduplication. Accordingly, when the receiving one of the storage controllers 14(1)-14(n) determines that a fragment exists with the same name, then the Yes branch is taken to step 345.

In step 345, the receiving one of the storage controllers 14(1)-14(n) does not store the fragments in the storage repositories 16(1)-16(n) and the exemplary method ends. By not sending the fragment, the technology disclosed herein avoids storing duplicate data in the storage repositories 16(1)-16(n) and also saves the bandwidth that would otherwise be utilized to store the fragment that is already present. Additionally in this example, the receiving one of the storage controllers 14(1)-14(n) stores the computed plaintext hash values, and the ciphertext hash values associated with the original object, as a separate recipe object in one or more of the storage repositories 16(1)-16(n), although the hash values can be stored at other locations.

However back in step 340, when the receiving one of the storage controllers 14(1)-14(n) determines that an object or fragment does not exists with the same name, then the No branch is taken to step 350.

In step 350, the receiving one of the storage controllers 14(1)-14(n) stores the object or fragment with the name of the computed ciphertext value and the exemplary method ends. Additionally in this example, the receiving one of the storage controllers 14(1)-14(n) stores the computed plaintext hash values, and the ciphertext hash values associated with the original object, as a separate recipe object in one or more of the storage repositories 16(1)-16(n), although the hash values can be stored at other locations. Optionally, the recipe object can also be encrypted for the purpose of data security. In this example, a namespace which maps the object name to a series of plaintext and ciphertext hashes is obtained from the recipe object retrieved from the storage repositories 16(1)-16(n), although the namespace can be stored at other locations. Further in this example, client computing devices 12(1)-12(n) that share the same tenant key can transfer objects, for example, by providing access to the recipe object or the contents of the recipe. Accordingly, the technology disclosed herein provides a low-bandwidth way to transfer objects between systems, and to synchronize updates to objects.

Figure 4:
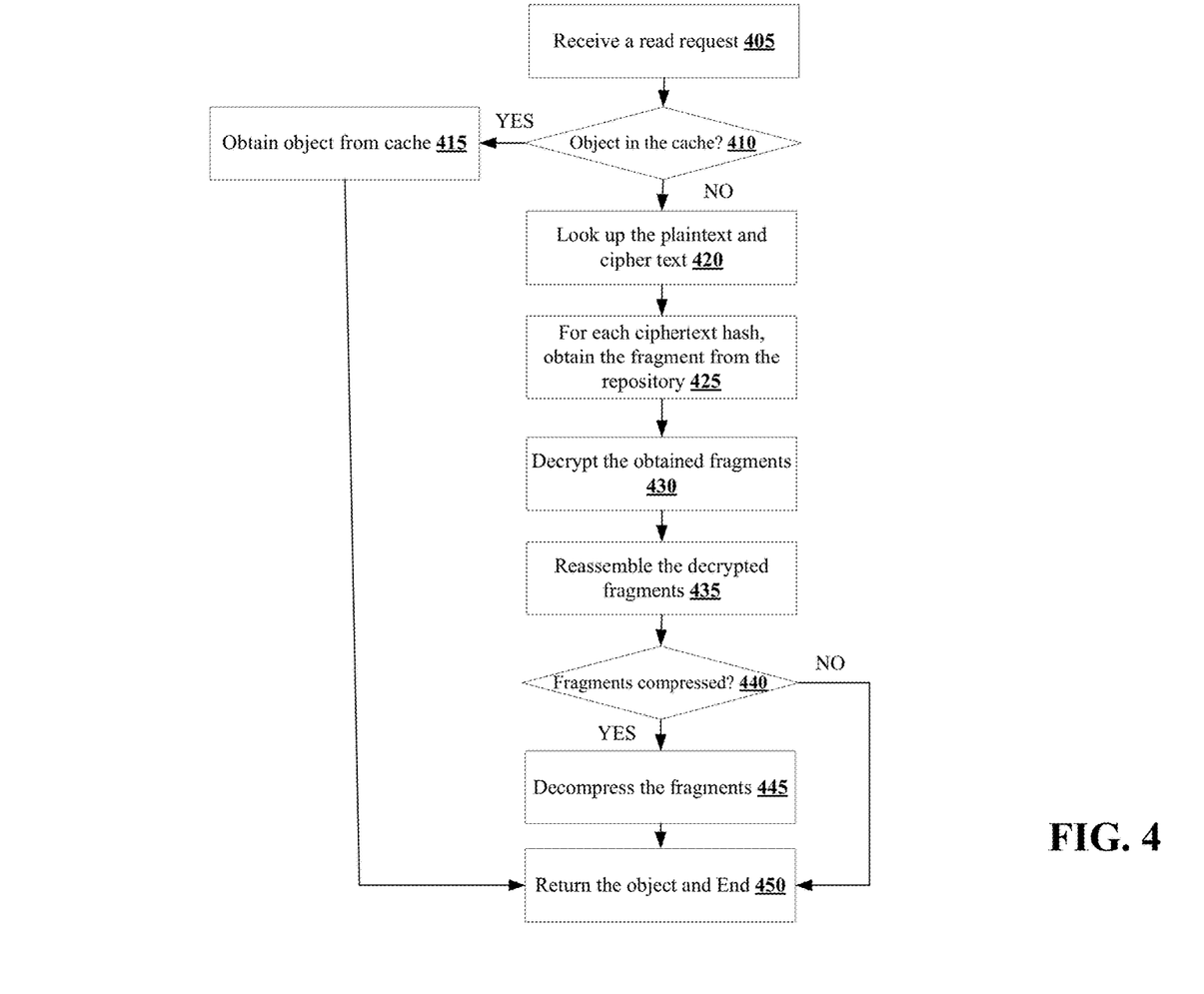

Referring more specifically to FIG. 4, an exemplary method of managing a read or GET request is illustrated. In step 405, one of the storage controllers 14(1)-14(n) receives a read or GET request for an object or file from one of the client computing devices 12(1)-12(n), although the storage controllers 14(1)-14(n) can receive other types or amounts of requests. In this example, the read or the GET request includes the name of the object or the file, although the received request can include other types or amounts of information.

Next in step 410, the receiving one of the storage controllers 14(1)-14(n) determines when the requested object is in the cache within the memory 20, although the receiving one of storage controllers 14(1)-14(n) can also determine when the object is present at other locations and can also check with the storage repositories 16(1)-16(n) to ensure that the cache is not stale. Accordingly, when the receiving one of the storage controllers 14(1)-14(n) determines that the requested object is within the cache of the memory 20, then the Yes branch is taken to step 415.

In step 415, the receiving one of the storage controllers 14(1)-14(n) obtains the requested object from the cache and the exemplary flow proceeds to step 450 where the requested object is returned back to the requesting one of the client computing devices 12(1)-12(n) and the flow ends.

However, back in step 410 when the receiving one of the storage controllers 14(1)-14(n) determines that the requested object or file is not present in the cache, then the Yes branch is taken to step 420.

In step 420, the receiving one of the storage controllers 14(1)-14(n) identifies or performs a lookup of plaintext and ciphertext hashes locally within the memory 20 or uses the name of the requested object to obtain the plaintext and ciphertext hashes from the recipe object stored in one or more of the storage repositories 16(1)-16(n), although the one of the storage controllers 14(1)-14(n) can use other techniques or parameters to lookup the plaintext and ciphertext hashes.

In step 425, the receiving one of the storage controllers 14(1)-14(n) obtains, for each of the ciphertext hash values, the fragments associated with the requested object or file from one or more of the storage repositories 16(1)-16(n), although the receiving one of the storage controllers 14(1)-14(n) can obtain the fragments from other locations. In this example, each of the fragments obtained from the one or more of the storage repositories 16(1)-16(n) is encrypted using the technique previously described and illustrated with reference to FIG. 3.

Next in step 430, the receiving one of the storage controllers 14(1)-14(n) verifies and decrypts each of the obtained encrypted fragments using the plaintext hash value corresponding to the ciphertext hash value; and also the tenant key associated with the requesting one of the client computing devices 12(1)-12(n), although the receiving one of the storage controllers 14(1)-14(n) can use other techniques to perform the decryption.

In step 435, the receiving one of the storage controllers 14(1)-14(n) verifies each of the decrypted fragments using the plaintext hash value, and begins to reassemble the decrypted fragments associated with the requested object. In this example, reassembling of the fragments is required because, as illustrated in FIG. 3, the objects are split into multiple fragments and stored at the storage repositories 16(1)-16(n). Accordingly, reassembling from the fragments is required to generate the complete requested object.

Next in step 440, the receiving one of the storage controllers 14(1)-14(n) determines if the reassembled fragments are compressed. In this example, the fragments stored at the storage repositories 16(1)-16(n) can be compressed and stored to utilize the storage memory space efficiently, although the fragments can be compressed for other purposes. Accordingly, when the receiving one of the storage controllers 14(1)-14(n) determines that the reassembled fragments are not compressed, then the No branch is taken to step 450 and the object is returned.

However when the receiving one of the storage controllers 14(1)-14(n) determines in step 440 that the fragments are compressed, then the Yes branch is taken to step 445.

In step 445, the receiving one of the storage controllers 14(1)-14(n) decompresses the compressed fragments using one or more data decompression algorithms.

Next in step 450, the receiving one of the storage controllers 14(1)-14(n) returns the requested object back to the requesting one of the client computing devices 12(1)-12(n) and the exemplary method ends at step 450.

Figure 5:
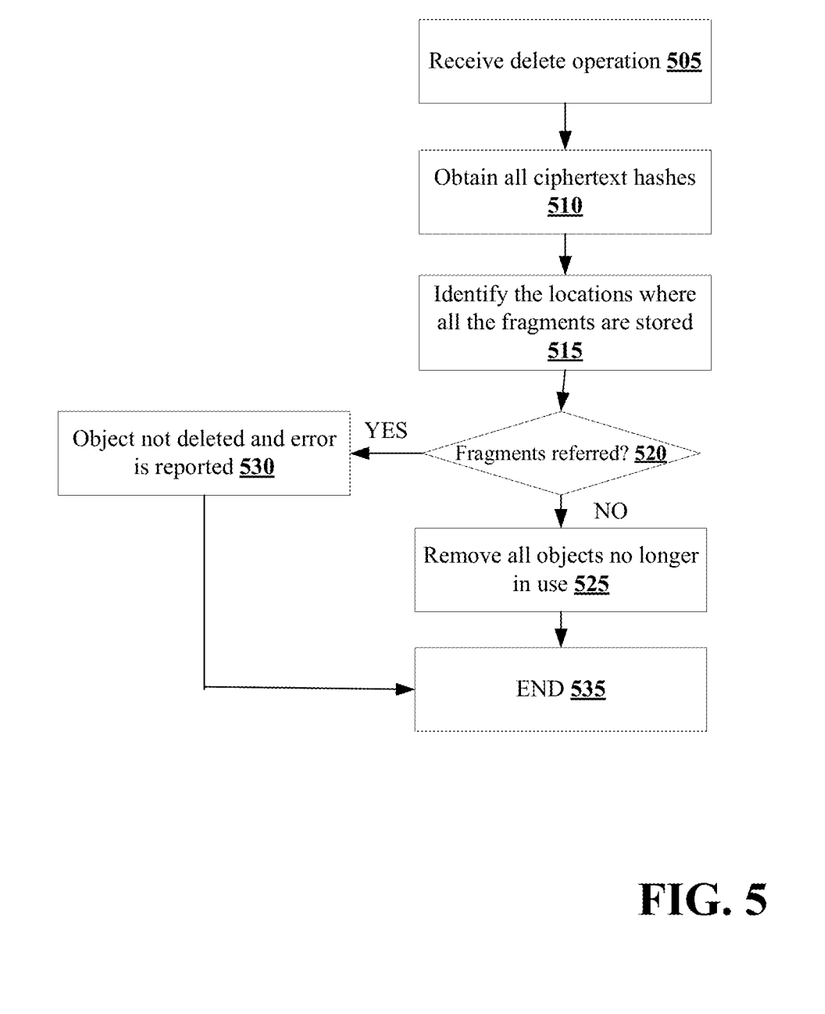

Referring more specifically to FIG. 5, an exemplary method for deleting objects is illustrated. The exemplary method beings at step 505 where one of the storage controllers 14(1)-14(n) receives a delete object or file request from one of the client computing devices 12(1)-12(n), although the storage controllers 14(1)-14(n) can receive other types or amounts of information. In this example, the delete request includes the name of the object or the file, although the received delete request can include other types or amounts of information. While this method is illustrated upon receipt of the delete request, the receiving one of the storage controllers 14(1)-14(n) can perform the operation of deleting the objects periodically in other examples.

Next in step 510, the receiving one of the storage controllers 14(1)-14(n) initiates the process to remove all of the stored ciphertext and the plaintext hashes by first storing a "tombstone" object for the recipe object in one or more of the storage repositories 16(1)-16(n), which marks the recipe object as becoming deleted at a specific point in time, although the receiving one of the storage controllers 14(1)-14(n) can mark or delete the ciphertext and the plaintext hashes from other locations.

Next in step 515, the receiving one of the storage controllers 14(1)-14(n) periodically identifies all of the storage repositories 16(1)-16(n) storing the fragments associated with the ciphertext hashes obtained from the recipe objects and any corresponding tombstone objects, if present, although the receiving one of the storage controllers 14(1)-14(n) can identify the fragments using other techniques or parameters. While this example illustrates the receiving one of the storage controllers 14(1)-14(n) performing this step, one or more storage controllers of the remaining plurality of storage controllers 14(1)-14(n) can also perform this step in other examples.

Next in step 520, the receiving one of the storage controllers 14(1)-14(n) determines when the identified fragments are referenced by other of the storage controllers 14(1)-14(n). In this example, the number of recipe objects containing a given ciphertext hash is counted, and the number of tombstone objects referring to a given ciphertext hash are subtracted. Accordingly, when the receiving one of the storage controllers 14(1)-14(n) determines that the fragments are not being referred (e.g., has a count of zero), then the No branch is taken to step 525. While this example illustrates the receiving one of the storage controllers 14(1)-14(n) performing this step, one or more of the remaining storage controllers 14(1)-14(n) can also perform this step in other examples.

In step 525, the receiving one of the storage controllers 14(1)-14(n) removes or deletes all the fragments, recipe objects, and tombstone objects no longer in use from the storage repositories 16(1)-16(n) and the exemplary method ends at step 535. Further in this example, the receiving one of the storage controllers 14(1)-14(n) may use a locking or conditional deletion mechanism to prevent race conditions. While this example illustrates the receiving one of the storage controllers 14(1)-14(n) performing this step, one or more of the remaining storage controllers 14(1)-14(n) can also perform this step in other examples.

However back in step 520, when the receiving one of the storage controllers 14(1)-14(n) determines that the fragments are being referenced, then the Yes branch is taken to step 530. While this example illustrates the receiving one of the storage controllers 14(1)-14(n) performing this step, one or more of the remaining storage controllers 14(1)-14(n) can also perform this step in other examples.

In step 530, the receiving one of the storage controllers 14(1)-14(n) does not delete the fragments, recipe objects, and tombstone objects, and the exemplary method ends at step 535.

In this example of deleting the object, the receiving one of the storage controllers 14(1)-14(n) avoids the race condition by using protocol Request for Comment (RFC) No. 7232, which is hereby incorporated by reference in its entirety. As it would be appreciated by a person having ordinary skill in the art, the HTTP specification supports conditional requests (e.g., as described in RFC No. 7232), including If-Unmodified-Since, prohibits an operation unless the object's creation/modification date is older than the specified data. As long as the date and time corresponding to the start of operation is used as a conditional for the delete operation, the race condition will not result in data being lost, as the delete operation will not be executed. While this example illustrates the receiving one of the storage controllers 14(1)-14(n) performing this step, one or more of the remaining storage controllers 14(1)-14(n) can also perform this step in other examples.

Additionally, the above illustrated write technique prevents the race condition by using the following technique after step 345 and before ending the exemplar method. In the example to prevent the race condition, the receiving one of the storage controllers 14(1)-14(n) updates the metadata for the object or performs another operation that updates the last modified time, effectively performing an operation to update the modified time on the fragment object. This technique eliminates the race condition window when the plurality of storage repositories 16(1)-16(n) have strong consistency with respect to the last modified time and the conditional delete request. Additionally, the race condition can also be solved by trying to update the object first to update modified time on the object, and then performing the fragment write when a data or object not found (such as a 404 error) is sent back to the requesting one of the client computing devices 12(1)-12(n). This also has the side effect of being more efficient over the wire.

An exemplary illustration of managing snapshots of the fragments stored in the storage repositories 16(1)-16(n) will now be described and illustrated with reference to FIGS. 6-8. To perform a global snapshot, one of the storage controllers 14(1)-14(n) computes a snapshot set that contains a complete set of ciphertext hashes and recipe objects associated with all the fragments in the storage repositories 16(1)-16(n), or directly from the other storage controllers 14(1)-14(n). To retain a non-global snapshot, the snapshot set contains a subset of ciphertext hashes associated with a given state of the filesystem or collection of objects that match snapshot criteria, such as for a given directory or file type, which is retained by the one of the storage controllers 14(1)-14(n), although the received list can be stored at other locations, such as by a separate snapshot management computing device (not illustrated) that interacts with one of the storage controllers 14(1)-14(n) using the same interface as the storage repositories 16(1)-16(n). Further in this example, for retention and compliance, snapshot sets can be created and marked as either not being removable, or requiring a hold to be released before they can be removed. This has applications for compliance and legal holds, as the entire contents of the enterprise-wide storage system, including cloud storage, can be immediately protected from deletion and alteration, without interfering with read/write system operation.

Figure 6:
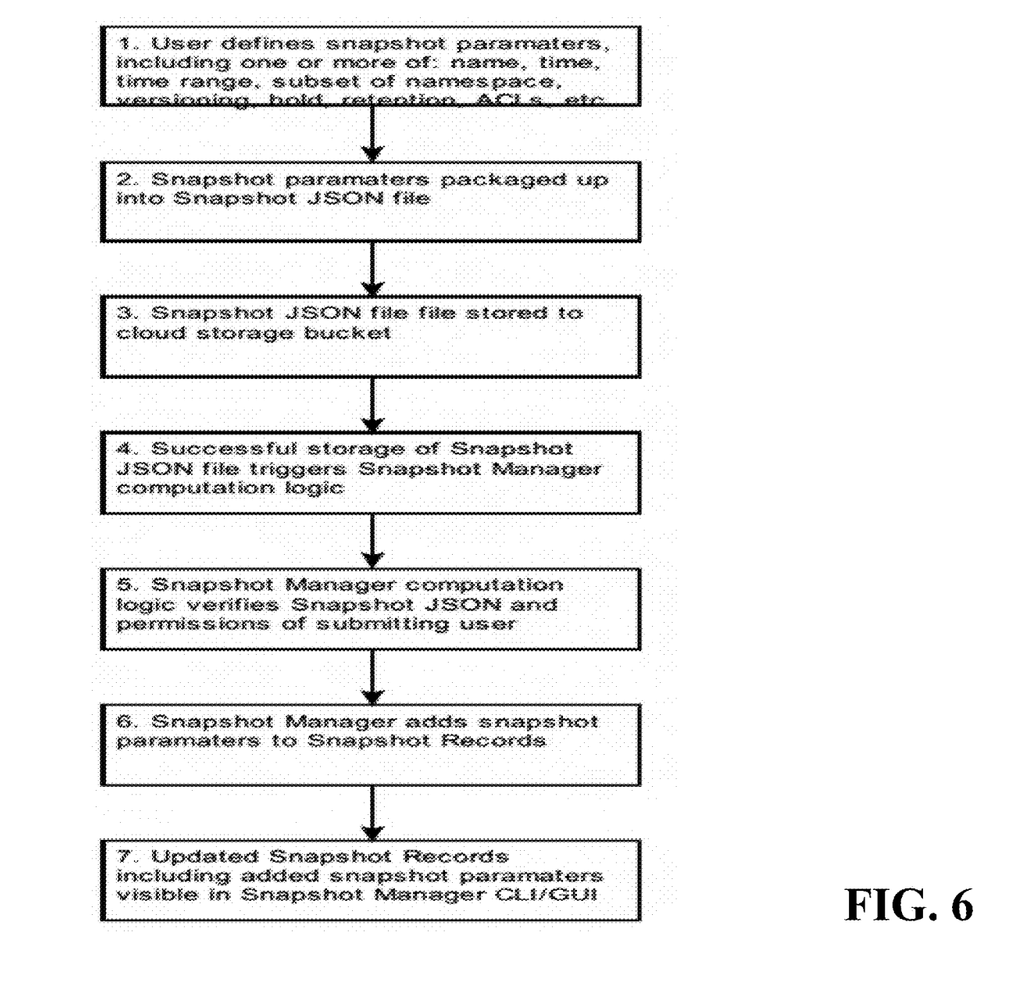
FIGS. 6-8 are exemplary flow charts of an example of a method for managing snapshots.

Referring more specifically to FIG. 6, an exemplary method for managing snapshot specifications is illustrated. In step 600 in this example, one of the storage controllers 14(1)-14(n) defines one or more snapshot parameters for a snapshot, including time, time range, subset of namespace, versioning, access control criteria, for example, although the one of the storage controllers 14(1)-14(n) can define other snapshot parameters.

Next, in step 602, the snapshot parameters are packaged by the one of the storage controllers 14(1)-14(n) into a snapshot request, which can be represented as a JavaScript Object Notation (JSON) file, although the one of the storage controllers 14(1)-14(n) can package the parameters into other formats in other examples. The snapshot request is then stored in step 604 to a cloud storage bucket, such as on a cloud one of the storage repositories 16(1)-16(n), for example, although the snapshot request can be stored at other locations.

In step 606, the storage of the snapshot request triggers immediate or deferred computation logic at the one of the storage controllers 14(1)-14(n). In step 608, the one of the storage controllers 14(1)-14(n) verifies and validates the snapshot request using the computation logic along with the permissions of a submitting user (e.g., of one of the client computing devices 12(1)-12(n).

Figure 7:
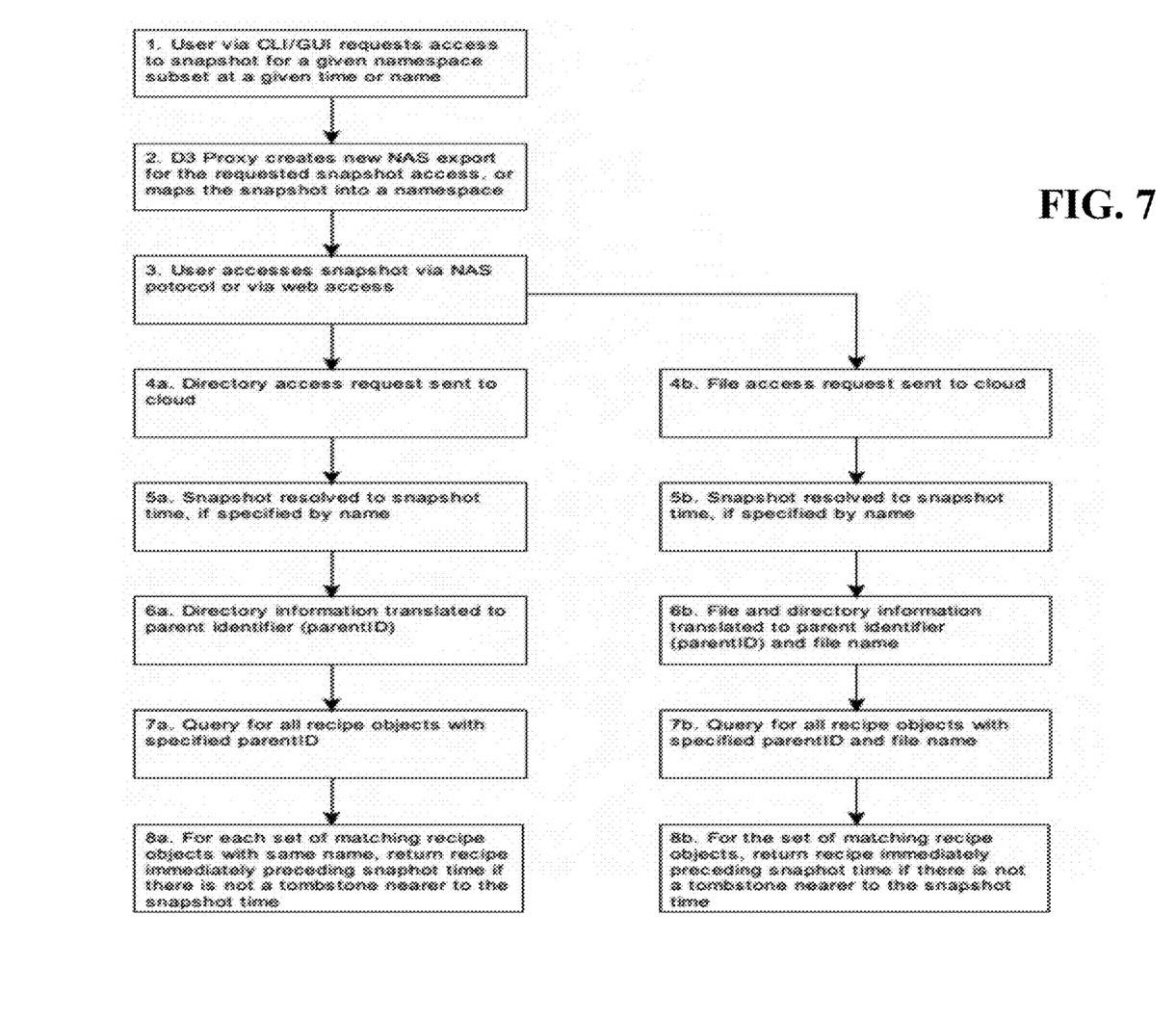

Referring more specifically to FIG. 7, an exemplary method for snapshot access is illustrated. In step 700, one of the storage controllers 14(1)-14(n) receives a request to access a snapshot for a given namespace subset at a given time or name from one of the client computing devices 12(1)-12(n), although the one of the storage controllers 14(1)-14(n) can receive other types of requests including other types of information.

Next, in step 702, the one of the storage controllers 14(1)-14(n) accesses the namespace using data in the received request, although other techniques can be used to access the namespace.

In step 704, the one of the storage controllers 14(1)-14(n) access the requested snapshot using a NAS protocol in response to a received request from one of the client computing devices 12(1)-12(n), although other types of protocols could also be used to access the snapshot. Additionally, the one of the storage controller 14(1)-14(n) sends out a request in steps 706A and 706B to access a file and a directory in parallel to an external device, such a one of the storage repositories 16(1)-16(n) or a snapshot management device (not illustrated) in a cloud network.

Next, in steps 708A and 708B, the snapshot is resolved to the corresponding snapshot request object by the one of the storage controllers 14(1)-14(n) to a snapshot time (e.g., as received directly in step 700, or as referenced by a name received in step 700) based on a specified name, although the snapshot can be resolved using other techniques.

Further, in steps 710A and 710B, the directory and file information is translated by the one of the storage controllers 14(1)-14(n) to a parent ID and file name and, in steps 712A and 712B, the one of the storage controllers 14(1)-14(n) queries for all the objects specified with the specified parent ID and the filename using the snapshot time to determine which recipe objects were valid at the corresponding snapshot time.

Furthermore, for each set of matching recipe objects with the same name, the one of the storage controllers 14(1)-14(n) returns, in steps 714A and 714B, a recipe immediately preceding the snapshot time back to the one of the client computing devices 12(1)-12(n).

Figure 8:
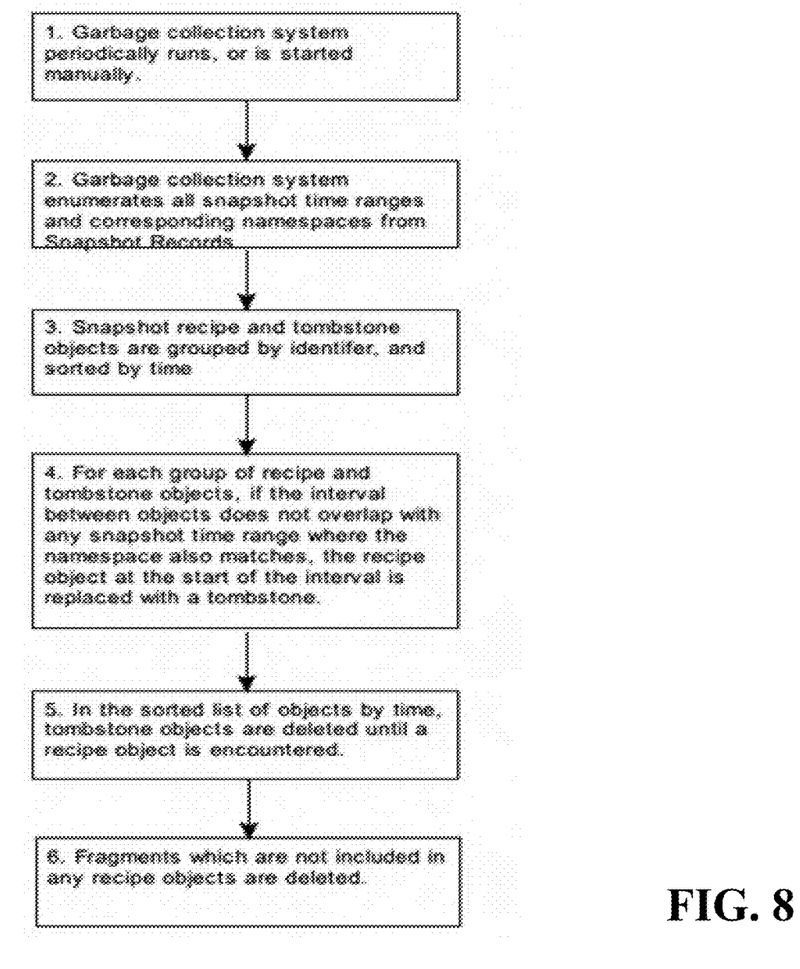

Referring more specifically to FIG. 8, an exemplary method for garbage collection of snapshots is illustrated. In step 800, a garbage collection process is initiated at one of the storage controllers 14(1)-14(n) and, in step 802, the one of the storage controllers 14(1)-14(n) enumerates all snapshot time ranges and corresponding namespaces from stored snapshot request objects.

Next, in step 804, the one of the controllers 14(1)-14(n) groups and sorts snapshot recipe and tombstone objects by identifier and time, respectively, although other parameters could be used to group and/or sort the snapshots.

In step 806, the one of the storage controllers 14(1)-14(n) determines, for each recipe and tombstone object, whether the interval between the recipe object and a tombstone object does not overlap with any snapshot time, where the namespace of the recipe object also matches that of the snapshot.

Next, in step 808, if the determination indicates that the interval does not overlap, the one of the storage controllers 14(1)-14(n) performs the same reference counting and recipe object and tombstone object deletion process described and illustrated in more detail earlier with reference to step 520.

Finally, in step 810, the one of the storage controller 14(1)-14(n) deletes fragments that are not included in any of the recipe objects.

Accordingly, with this technology, files are stored as fragment objects (each named with the hash of the fragment), and recipe objects (each containing metadata such as a parent identifier, a parent name, a file name, and an ordered list of the hash of each fragment objects that comprises a given file). Fragment objects are immutable, and are garbage collected when no longer referenced in any recipe objects. When an existing file is deleted, a tombstone object is created, and when an existing file is updated, the corresponding recipe object is either appended with the updated recipe object, or a new recipe object is created.

Further, the primary user-visible snapshot functionality that is enabled includes named snapshots, time range snapshots, versioning snapshots, retention, version browse and access, single file store, selective file store, snapshot browse, snapshot restore, snapshot compare, and snapshot clone. In named snapshots, a user manually or programmatically indicates that a given point in time subset of the global namespace is associated with a snapshot name in the snapshot request object. All recipes and fragments that intersect with the specified time are retained until such time that the named snapshot is released. In time range snapshots (also referred to as versioning snapshots) a user manually or programmatically indicates that all changes in a given time range for a subset of the global namespace is associated with a snapshot name in the snapshot request object. All recipes and fragments that intersect with the specified time range are retained until such time that the time range snapshot is released. All historical recipes and fragments that match the subset of the namespace are retained until such time that the snapshot request is deleted.

In retention, a user manually or programmatically indicates that a subset of the global namespace is to be retained for a given duration of time (retention), or until further notice (hold), is associated with a snapshot name in the snapshot request object. All recipes and fragments that match the subset of the namespace are retained until such time that the retention and/or hold is released.

Further, in version browse and access, a user can manually or programmatically access historical versions of any element in the namespace, where present. In a single file restore, a user can manually or programmatically replace the current version of a file with a historical version or version from a named snapshot (or specific time), where present. The selective file restore provides a user to manually or programmatically restore files that match a given set of criteria, such as files encrypted by ransomware. In snapshot browse, a user can manually or programmatically access a subset of the namespace as it existed at a given time or named snapshot using file system protocols. In a snapshot restore, a user can manually or programmatically replace a current namespace with a prior namespace as it existed at a given time or named snapshot. In snapshot compare a user can manually or programmatically compare the differences between a namespace at one point in time or named snapshot, and another point in time or named snapshot. In snapshot clone a user can manually or programmatically clone a snapshot into another part of the namespace, and once cloned, modify it independently from the original namespace.

Further in this example, in order to access a point-in-time file from a snapshot, the following translation needs to be performed: named snapshot resolved to time T, if not specified directly; directory and file name A translated to recipe P that existed at time T.

In order to access a point-in-time directory listing (either from a snapshot, or at an arbitrary point in time), the following translation needs to be performed: named snapshot resolved to time T, if not specified directly; query performed across all recipe files to identify directory and file names that existed at time T.

Using these two techniques, snapshot views of namespace contents can be accessed via a web interface, via network file protocols, via versioned access protocols, or via cloud protocols such as CDMI that directly support snapshot and versioned file/object access.

Accordingly, as illustrated and described by way of the examples herein, this technology provides a number of advantages including providing methods, non-transitory computer readable media and devices for improved management of data storage in a distributed de-duplication system. Using the above illustrated techniques, the technology disclosed herein is able to use processor and memory resources minimally for client computing devices to facilitate data storage and storage operations. Additionally, fragments of the objects or files can be stored without requiring modifications to the storage repositories. Furthermore, the technology does not waste computing resources on non-de-duplicable data. Additionally, the technology allows hybrid public/private cloud de-duplication and supports multi-tenant de-duplication with full tenant security isolation. The technology also improves efficiency of namespace migration between systems and tenants.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:
1. A method, comprising:
identifying, by a computing device, one or more file recipe objects that existed at a time at which at least a portion of a namespace is to be restored, wherein the portion of the namespace comprises one or more directories and the time is included in a received snapshot access request;
determining, by the computing device, from the file recipe objects one or more directory names for one or more of the directories that existed at the time, wherein the file recipe objects each comprise metadata that describes one of the directories and comprises one of the directory names;
identifying, by the computing device, content of the one or more of the directories based on the determined directory names; and
returning, by the computing device, one or more files, included in the identified content and existing within the namespace at the time, in response to the snapshot access request in order to facilitate restoration of the portion of the namespace.

2. The method as set forth in claim 1, further comprising periodically performing, by the computing device, a garbage collection operation to delete one or more of the file recipe objects that are marked for deletion by one or more stored tombstone objects.

3. The method as set forth in claim 2, further comprising identifying, by the computing device, a snapshot request object based on the time, wherein the snapshot request object defines a plurality of snapshot parameters including a time range for a snapshot associated with the snapshot request object and each of the file recipe objects intersects with the time range.

4. The method as set forth in claim 3, further comprising marking, by the computing device, the one or more file recipe objects for deletion by the one or more stored tombstone objects when the one or more of the file recipe objects are outside of the time range.

5. The method as set forth in claim 1, wherein one of the file recipe objects comprises an ordered list of hash values for fragment objects that collectively comprise one of the files and the method further comprises obtaining, by the computing device, each of the fragment objects from one or more storage repositories using the hash values.

6. The method as set forth in claim 5, further comprising reassembling, by the computing device, the fragment objects to form the file before returning the file in response to the snapshot access request.

7. A non-transitory machine readable medium having stored thereon instructions for managing snapshots comprising machine executable code which when executed by a machine, causes the machine to:
   identify one or more file recipe objects that existed at a time at which at least a portion of a namespace is to be restored, wherein the portion of the namespace comprises one or more directories and the time is included in a received snapshot access request;
   determine from the file recipe objects one or more directory names for one or more of the directories that existed at the time, wherein the file recipe objects each comprise metadata that describes one of the directories and comprises one of the directory names;
   identify content of the one or more of the directories based on the determined directory names, wherein the content comprises one or more files existing within the namespace at the time; and
   return the one or more files in response to the snapshot access request in order to facilitate restoration of the portion of the namespace.

8. The non-transitory machine readable medium as set forth in claim 7, wherein the machine executable code, when executed by the machine, further causes the machine to periodically perform garbage collection operation to delete one or more of the file recipe objects that are marked for deletion by one or more stored tombstone objects.

9. The non-transitory machine readable medium as set forth in claim 8, wherein the machine executable code, when executed by the machine, further causes the machine to identify a snapshot request object based on the time, wherein the snapshot request object defines a plurality of snapshot parameters including a time range for a snapshot associated with the snapshot request object and each of the file recipe objects intersects with the time range.

10. The non-transitory machine readable medium as set forth in claim 9, wherein the machine executable code, when executed by the machine, further causes the machine to mark the one or more file recipe objects for deletion by the one or more stored tombstone objects when the one or more of the file recipe objects are outside of the time range.

11. The non-transitory machine readable medium as set forth in claim 7, wherein the of the file recipe objects comprises an ordered list of hash values for fragment objects that collectively comprise one of the files and the machine executable code, when executed by the machine, further causes the machine to obtain each of the fragment objects from one or more storage repositories using the hash values.

12. The non-transitory machine readable medium as set forth in claim 11, wherein the machine executable code, when executed by the machine, further causes the machine to reassemble the fragment objects to form the file before returning the file in response to the snapshot access request.

13. A computing device comprising:
   a memory containing a machine readable medium comprising machine executable code having stored thereon instructions for managing snapshots; and
   a processor coupled to the memory, the processor configured to execute the machine executable code to cause the processor to:
      identify a file recipe object that existed at a time at which a namespace is to be restored, wherein the namespace comprises a directory and the time is included in a received snapshot access request;
      determine from the file recipe object a directory name for the directory, wherein the file recipe object comprises metadata that describes the directory and comprises the directory name;
      identify content of the directory based on the directory name; and
      return one or more files, included in the identified content and existing within the namespace at the time, in response to the snapshot access request.

14. The computing device as set forth in claim 13, wherein the processor is further configured to execute the machine executable code to cause the processor to periodically perform garbage collection operation to delete one or more file recipe objects that are marked for deletion by one or more stored tombstone objects.

15. The computing device as set forth in claim 14, wherein the processor is further configured to execute the machine executable code to cause the processor to identify a snapshot request object based on the time, wherein the snapshot request object defines a plurality of snapshot parameters including a time range for a snapshot associated with the snapshot request object and each of the one or more file recipe objects intersects with the time range.

16. The computing device as set forth in claim 15, wherein the processor is further configured to execute the machine executable code to cause the processor to mark the one or more file recipe objects for deletion by the one or more stored tombstone objects when the one or more file recipe objects are outside of the time range.

17. The computing device as set forth in claim 13, wherein the file recipe object comprises an ordered list of hash values for fragment objects that collectively comprise the file and the processor is further configured to execute the machine executable code to cause the processor to obtain the fragment objects from a storage repository using the hash values.

18. The computing device as set forth in claim 17, wherein the processor is further configured to execute the machine executable code to cause the processor to reassemble the fragment objects to form the file before returning the file in response to the snapshot access request.

19. The computing device as set forth in claim 13, wherein the processor is further configured to execute the machine executable code to cause the processor to create the namespace to comprises a plurality of files described by a plurality of file recipe objects and each comprising one or more fragments, one or more directories described by metadata in the file recipe objects and each comprising one or more of the files, and one or more snapshots described by one or more stored snapshot request objects.

20. The computing device as set forth in claim 19, wherein the processor is further configured to execute the machine executable code to cause the processor to delete one or more of the fragments unspecified in any of the file recipe objects.

\* \* \* \* \*